F. S. GOLD.
WINDSHIELD CLEANER.
APPLICATION FILED APR. 7, 1920.
1,347,628.
Patented July 27, 1920.
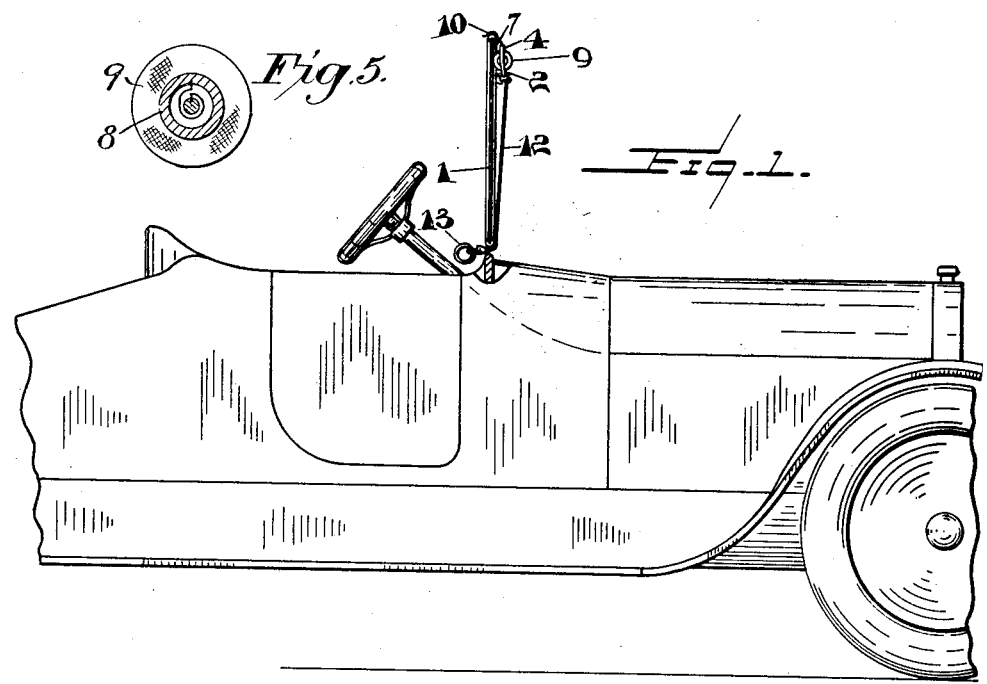
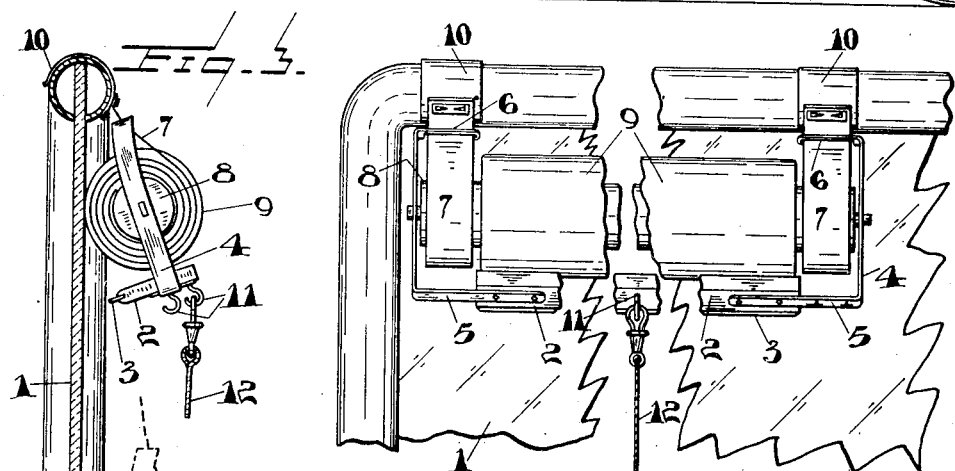
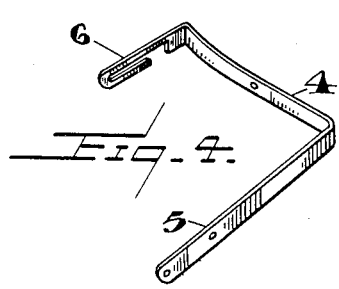
INVENTOR.
F. S. Gold.
BY J. Edward Maybee.
ATTY.

UNITED STATES PATENT OFFICE.

FRANK S. GOLD, OF TORONTO, ONTARIO, CANADA.

WINDSHIELD-CLEANER.

1,347,628.   Specification of Letters Patent.   Patented July 27, 1920.

Application filed April 7, 1920. Serial No. 372,010.

*To all whom it may concern:*

Be it known that I, FRANK S. GOLD, of the city of Toronto, in the county of York, Province of Ontario, Canada, have invented certain new and useful Improvements in Windshield-Cleaners, of which the following is a specification.

This invention relates to devices used for cleaning the outer surfaces of the glass plates used in motor vehicles, street cars and the like to shield the driver from wind and weather, and my object is to devise a cleaner which is always out of the way and yet always ready for use, and which will not only scrape off rain drops and snow, but will also mop up moisture remaining on the glass after the passage of the scraper.

I attain my object by means of the constructions hereinafter described and illustrated in the accompanying drawings in which—

Figure 1 is a side elevation of part of a motor car showing its windshield in section and provided with my improved cleaner;

Fig. 2 a front elevation of part of the windshield with my attachment in position and partly broken away;

Fig. 3 a side elevation of the same, partly in section;

Fig. 4 a perspective detail of one of the arms carrying the scraper bar and wiper roller; and Fig. 5 a cross section of the roller.

In the drawings like numerals of reference indicate corresponding parts in the different figures.

1 is the windshield of a motor car, though it will be understood, of course, that my device is equally applicable to the glass panes of street car vestibules and the like. The device itself comprises a scraper, a spring roller provided with a mopping surface and revolubly mounted on the scraper, and flexible belts each connected at one end to the roller and adapted to be wound thereon and having their other ends adapted to be connected with a stationary part such as the top member of a windshield frame. The scraper comprises the scraper bar 2 having its rearward edge provided with the flexible strip 3, and the arms 4 secured to the scraper strip. These arms, as shown particularly in Fig. 2, are each provided with the part 5 secured to the scraper bar and with the laterally and inwardly extending parts 6 forming guides for the belts 7. In the arms 4 is supported the spring roller 8, which is of the ordinary type employed for window shades, the coil spring therein being connected at one end to the roller and at its other end to a pin held from turning in one of the arms 4. To the ends of the roller, the belts 7 are secured and about them they are wound by the action of the spring of the roller.

Intermediate its ends, the roller is provided with a mopping surface 9 of felt, chamois or any other suitable material. This cylindrical mopping surface is of such diameter that it will contact with the front surface of the windshield when the scraper strip 3 is also in contact therewith as indicated in dotted lines in Fig. 3.

The upper ends of the belt 7 are preferably provided with hooks 10 by means of which they may be detachably engaged with the upper member of the windshield frame. Other connecting means will, of course, be employed when the device is used with different types of windshield.

The arms 4 are connected with the scraper bar back from the operative edge thereof, and intermediate its ends the scraper bar is provided with one or more eyes 11 at different distances back from the operative edge of the scraper, so that the operating cord 12 may be connected to the scraper bar at different distances from the operative edge thereof as may be necessary to give a proper direction of pull to hold both the scraper strip 3 and the mopping surface 9 in proper contact with the surface of the windshield.

It will be understood, of course, that by the term "belt" applied to the parts 7 I mean any flexible part adapted to be wound on the roller to produce the revolution thereof, and by the term "cord" applied to the part 12, I means any suitable flexible connection by means of which the scraper and roller may be operated.

The cord 12 is carried through an opening below the windshield frame and is provided with a ring 13 or other conveniently grasped part by means of which it may be operated.

Normally the device lies at the top of the windshield as shown in the drawings. To operate it, it is merely necessary for the driver to pull on the ring 13 and the scraper edge will contact with the outer surface of the glass of the windshield, after which the scraper and roller will travel down the glass as indicated in dotted lines in Fig. 3 as far as the driver desires to pull them. The scraper removes the rain drops or snow from the surface of the glass, while the roller following either absorbs the film of moisture remaining on the glass surface or so spreads the same that it will not interfere with clear vision.

What I claim as my invention is:—

1. A windshield cleaner comprising a spring roller provided with a mopping surface; and flexible belts, each connected at one end to the roller and adapted to be wound thereon and having its other end connected with a stationary part at one side of the surface to be cleaned; and means for drawing the roller over the surface to be cleaned.

2. A windshield cleaner comprising a scraper; a spring roller journaled on the scraper and provided with a mopping surface; and flexible belts, each connected at one end to the roller and adapted to be wound thereon and having its other end connected with a stationary part at one side of the surface to be cleaned.

3. A windshield cleaner comprising a scraper bar; arms secured to the ends of the scraper bar back from the operative edge thereof; a spring roller journaled on said arms; and flexible belts adapted to be wound thereon.

4. A windshield cleaner constructed as set forth in claim 3 provided with a plurality of connections for an operating cord at different distances from the operative edge of the scraper bar.

5. A windshield cleaner constructed as set forth in claim 3 having belt guides extending laterally and inwardly from the arms carrying the scraper bar.

Signed at Toronto Canada this 24th day of March 1920.

FRANK S. GOLD.